(12) United States Patent
Chen

(10) Patent No.: US 7,635,924 B1
(45) Date of Patent: Dec. 22, 2009

(54) WIND POWER GENERATION SYSTEM

(75) Inventor: Siao-Yang Chen, Taipei County (TW)

(73) Assignee: Apollo New Jersey Corporation, Taoyuan County (TW)

( * ) Notice: Subject to any disclaimer, the term of this patent is extended or adjusted under 35 U.S.C. 154(b) by 0 days.

(21) Appl. No.: 12/334,954

(22) Filed: Dec. 15, 2008

(51) Int. Cl.
*F03D 9/00* (2006.01)
*H02P 9/04* (2006.01)

(52) U.S. Cl. ...................................................... 290/44

(58) Field of Classification Search ............... 290/44, 290/55; 415/2.1, 4.2, 7; 60/398; 416/132 B
See application file for complete search history.

(56) References Cited

U.S. PATENT DOCUMENTS

| | | | | |
|---|---|---|---|---|
| 5,394,016 A * | 2/1995 | Hickey | | 290/55 |
| 6,172,429 B1 * | 1/2001 | Russell | | 290/54 |
| 6,362,540 B1 * | 3/2002 | Hill | | 307/52 |
| 7,323,791 B2 * | 1/2008 | Jonsson | | 290/55 |
| 2007/0126240 A1 * | 6/2007 | Richards et al. | | 290/55 |
| 2007/0138797 A1 * | 6/2007 | Reidy et al. | | 290/44 |
| 2008/0150286 A1 * | 6/2008 | Fein et al. | | 290/44 |
| 2008/0150296 A1 * | 6/2008 | Fein et al. | | 290/1 R |
| 2008/0150298 A1 * | 6/2008 | Fein et al. | | 290/4 R |
| 2008/0154800 A1 * | 6/2008 | Fein et al. | | 705/412 |
| 2008/0258467 A1 * | 10/2008 | Wilson et al. | | 290/54 |
| 2008/0315592 A1 * | 12/2008 | Branco | | 290/55 |

* cited by examiner

*Primary Examiner*—J. Gonzalez
(74) *Attorney, Agent, or Firm*—Muncy, Geissler, Olds & Lowe, PLLC

(57) ABSTRACT

A wind power generation system includes at least one windward power generation area, at least one maintenance and repair area, a transmission system and an auto-management system. The windward power generation area includes a wind power generation unit. With the wind power generation system of the invention, the wind power generation unit can be replaced or maintained easily if the wind power generation unit breaks down, and thus the invention can reduce the maintenance cost and manpower and enhance the efficiency of using green energy.

7 Claims, 2 Drawing Sheets

WIND POWER GENERATION SYSTEM

FIELD OF THE INVENTION

The present invention relates to a wind power generation system, and more particularly to a management system for managing a group of wind power generation units and capable of replacing or maintaining the wind power generation units easily.

BACKGROUND OF THE INVENTION

As new developing countries rise, there are increasingly more middle-class people who pursue a better quality of life and consume lots of power, and such a huge consumption leads to an increasingly higher demand of energy, and thus the price of oil rises rapidly, and the environmental pollution becomes a serious issue. Obviously, developing and applying a new clean and green energy demands immediate attentions and feasible solutions.

In present conventional green energy sources such as solar power generation systems, wind power generation systems and even tidal power generation systems, all green energy sources other than the wind power generation system are still at the stage of improving the efficiency of generating power or at a theoretical stage. The conventional wind power generation systems are generally large systems installed in an open area. For example, a large wind power generation system is installed along a seashore. However, if such large-sized wind power generation system breaks down, the maintenance cost is very high, and more importantly, the maintenance process is very troublesome and even requires a super-large hoist for removing and reinstalling the system after the maintenance is made. It is pity, but yet common to see abandoned governmental large wind power generation systems, and such outcome is definitely not the original intention of protecting environment. Furthermore, tremendous governmental expenditures are wasted.

Therefore, it is an important subject for this invention to develop a wind power generation system capable of replacing, maintaining or repairing the wind power generation units easily to reduce maintenance cost, time and effort, so as to improve the application and efficiency of green energy.

SUMMARY OF THE INVENTION

In view of the shortcomings of the conventional wind power generation systems, the inventor of the present invention based on years of experience to conduct extensive researches and experiments, and finally developed a wind power generation system in accordance with the present invention to overcome the shortcomings of the prior art.

Therefore, the primary objective of the present invention is to provide a wind power generation system, in hope of achieving the effects of reducing maintenance cost, time and effort as well as improving the application and efficiency of green energy.

To achieve the foregoing objective, the present invention provides a wind power generation system comprising: at least one windward power generation area, being a hollow structure, and having a wind power generation unit; at least one maintenance and repair area, for maintaining and repairing the wind power generation unit; a transmission system, connected to the windward power generation area and the maintenance and repair area, for conveying the wind power generation unit; and an auto-management system, for managing the windward power generation area, the maintenance and repair area and the transmission system.

The wind power generation system definitely can achieve the effects of reducing maintenance cost, time and effort as well as improving the application and efficiency of green energy.

DESCRIPTION OF THE PREFERRED EMBODIMENT

Other features and advantages of the present invention will become apparent in the following detailed description of the preferred embodiments with reference to the accompanying drawings.

Figure 1:
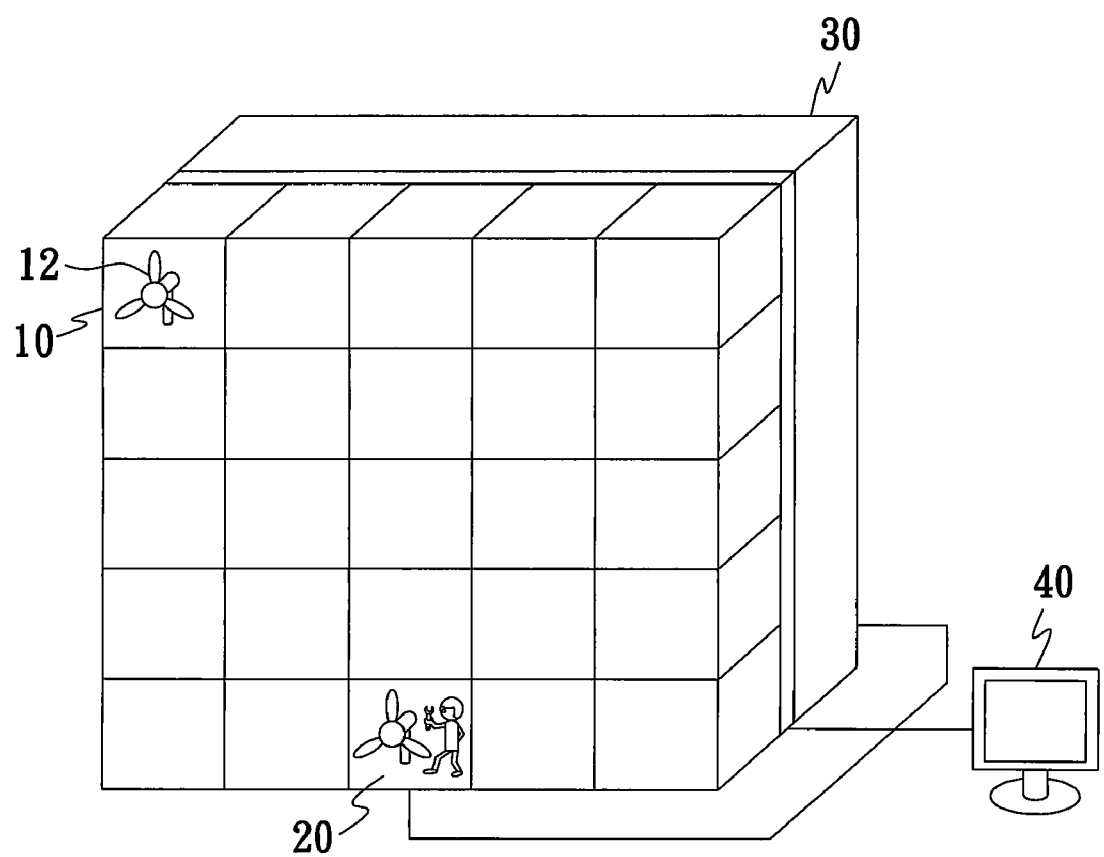
FIG. 1 is a schematic view of a wind power generation system in accordance with the present invention.
Figure 2A:
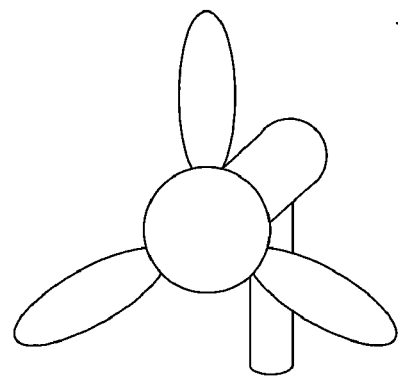
FIG. 2A is a perspective view of a horizontal-axis wind power generation unit in accordance with the present invention.
Figure 2B:
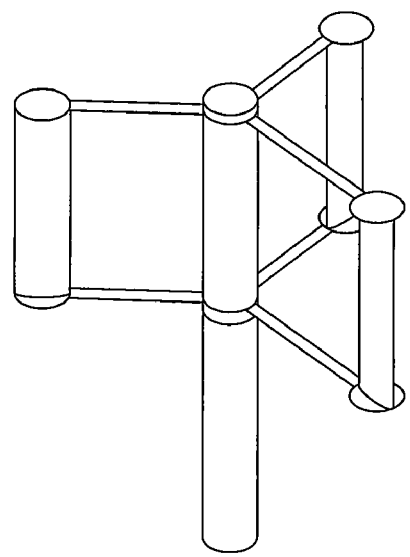
FIG. 2B is a perspective view of a vertical-axis wind power generation unit in accordance with the present invention.

With reference to FIG. 1 for a wind power generation system in accordance with the present invention, the system comprises at least one windward power generation area 10, at least one maintenance and repair area 20, a transmission system 30 and an auto-management system 40. The windward power generation area 10 is a hollow structure for allowing wind to flow smoothly without turbulence, and comes with dimensions of 3 m×3 m×3.5 m (Length, Width, and Height). The windward power generation area 10 includes a wind power generation unit 12 which is a horizontal-axis wind power generation unit (as shown in FIG. 2A) or a vertical-axis wind power generation unit (as shown in FIG. 2B). The maintenance and repair area 20 is provided for maintaining and repairing the wind power generation unit 12 and can be disposed at any position of the wind power generation system. Taking the intensity of wind into consideration, we generally set the maintenance and repair area 20 at a weak wind position, preferably a position near the ground, in order to use the wind effectively. The transmission system 30 is also a hollow structure that will affect the direction of wind to produce turbulence. The transmission system 30 is connected to the windward power generation area 10 and the maintenance and repair area 20 for conveying a damaged wind power generation unit 12 from the windward power generation area 10 to the maintenance and repair area 20, and then conveying the repaired wind power generation unit 12 from the maintenance and repair area 20 back to the windward power generation area 10. The auto-management system 40 is provided for managing the windward power generation area 10, the maintenance and repair area 20 and the transmission system 30. In a preferred embodiment of the invention, the windward power generation area 10 includes a power generation detector, such that if the power generation detector detects a low power generation of the windward power generation area 10, the situation of low power generation will be reported to the auto-management system 40, and the auto-management system 40 will issue a command to the wind power generation unit 12 installed in the windward power generation area 10 and transmit the command from the transmission system 30 to the maintenance and repair area 20 for performance the maintenance and repair, and then the repaired wind power generation unit 12 will be conveyed from the maintenance and repair area 20 back to the windward power generation area 10.

In summation of the description above, the invention overcomes the shortcomings of the prior art by installing at least one windward power generation area, at least one maintenance and repair area, a transmission system and an auto-management system, such that when the wind power generation unit breaks down, the wind power generation unit can be replaced or repaired easily to reduce maintenance cost, time and effort, so as to improve the application and efficiency of green energy. The invention complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A wind power generation system, comprising:
   at least one windward power generation area, being a hollow structure, and including a wind power generation unit;
   at least one maintenance and repair area, for maintaining and repairing the wind power generation unit;
   a transmission system, connected to the windward power generation area and the maintenance and repair area, for conveying the wind power generation unit, the windward power generation area and the maintenance and repair area being in situ in the transmission system whereby repair of the wind power generation unit is done on site;
   a power generation detector for detecting power generation of the wind power generation unit; and
   an auto-management system, for managing the windward power generation area, the maintenance and repair area and the transmission system, the power generation detector being electrically connected to the auto-management system to detect a low power generation of the windward power generation area whereupon the auto-management system will issue a command to the maintenance and repair area to repair the wind power generation unit.

2. The system of claim 1, wherein the wind power generation unit is a horizontal-axis wind power generation unit.

3. The system of claim 1, wherein the wind power generation unit is a vertical-axis wind power generation unit.

4. The system of claim 1, wherein the wind power generation unit is returned from the on site maintenance and repair area to the windward power generation area after repair.

5. The system of claim 1, wherein the transmission system is a hollow structure that will effect direction of wind to produce turbulence.

6. The system of claim 5, wherein windward power generation area is located above the maintenance and repair area and the transmission system physically extends between the windward power generation area and the maintenance and repair area.

7. The system of claim 6, wherein the transmission system is larger in size than both the windward power generation area and the maintenance and repair area.

* * * * *